United States Patent [19]

Farrell

[11] Patent Number: 5,388,321
[45] Date of Patent: Feb. 14, 1995

[54] METHOD OF MAKING A HOSE CONSTRUCTION USING HEAT SHRINKABLE MATERIAL

[75] Inventor: James H. Farrell, Rochester Hills, Mich.

[73] Assignee: Dayco Products, Inc., Dayton, Ohio

[21] Appl. No.: 68,466

[22] Filed: May 27, 1993

[51] Int. Cl.$^6$ ............................................... F16L 33/02
[52] U.S. Cl. ............................................ 29/447; 29/508; 285/381; 285/252; 285/253; 285/23; 285/242
[58] Field of Search ............... 285/381, 243, 253, 254, 285/23, 238, 242; 29/447, 508, 453, 525.1, 450

[56] References Cited

U.S. PATENT DOCUMENTS

| | | | |
|---|---|---|---|
| 3,407,448 | 10/1968 | Tetzlaff et al. | 285/253 |
| 4,135,744 | 1/1979 | Fouts | 285/253 |
| 4,453,289 | 6/1984 | Kleykamp et al. | 24/20 TT |
| 5,002,094 | 3/1991 | Brovont | 285/252 |
| 5,145,218 | 9/1992 | Worley et al. | 285/243 |
| 5,185,913 | 2/1993 | Campo et al. | 29/453 |
| 5,195,788 | 3/1993 | Oetiker | 285/381 |
| 5,234,233 | 8/1993 | Fix | 285/252 |

FOREIGN PATENT DOCUMENTS

| | | | |
|---|---|---|---|
| 2630808 | 11/1989 | France | 285/253 |
| 3543717 | 6/1987 | Germany | 285/252 |
| 4112274 | 10/1992 | Germany | 285/381 |

*Primary Examiner*—Eric K. Nicholson
*Attorney, Agent, or Firm*—Joseph V. Tassone

[57] ABSTRACT

A hose construction and method of making the same are provided, the hose construction comprising a tubular flexible hose having opposite ends, fastening structure, and a clamp fastened to one of the opposite ends of the hose by the fastening structure for substantially circumferentially and radially inwardly clamping the one of the opposite ends of the hose onto a member that has been inserted into the one of the opposite ends of the hose, the fastening structure comprising a tube of heat shrinkable material disposed over and against part of the clamp and having opposite annular side sections respectively disposed outboard of the clamp and having been heat shrunk to circumferentially and radially inwardly engage against the one of the opposite ends of the hose to hold the clamp thereon.

7 Claims, 4 Drawing Sheets

5,388,321

METHOD OF MAKING A HOSE CONSTRUCTION USING HEAT SHRINKABLE MATERIAL

BACKGROUND OF THE INVENTION

1. Field of the Invention

This invention relates to a new hose construction and to a new method of making the hose construction.

2. Prior Art Statement

It is known to provide a hose construction comprising a tubular flexible hose having opposite ends, fastening means, and a clamping means fastened to one of the opposite ends of the hose by the fastening means for substantially circumferentially and radially inwardly clamping the one of the opposite ends of the hose onto a member that has been inserted into the one of the opposite ends of the hose. For example, see the Worley et al, U.S. Pat. No. 5,145,218 and the Campo et al, U.S. Pat. No. 5,185,913.

Also see the Kleykamp et al, U.S. Pat. No. 4,453,289 for other fastening means for fastening a clamping means to an end of a flexible hose.

SUMMARY OF THE INVENTION

It is one of the features of this invention to provide a new hose construction wherein the fastening means for fastening a clamping means to one end of a flexible hose can be uniquely and effectively assembled thereto in a simple manner.

In particular, it has been found according to the teachings of this invention that a tube of heat shrinkable material can be utilized to fasten the clamping means on the end of a flexible hose by a heat shrinking operation, the tube of heat shrinkable material being disposed over and against part of the clamping means and having opposite annular side sections respectively disposed outboard of the clamping means and being heat shrunk to circumferentially and radially inwardly engage against the end of the hose to hold the clamping means thereon.

For example, one embodiment of this invention comprises a hose construction comprising a tubular flexible hose having opposite ends, fastening means, and a clamping means fastened to one of the opposite ends of the hose by the fastening means for substantially circumferentially and radially inwardly clamping the one of the opposite ends of the hose onto a member that has been inserted in the one of the opposite ends of the hose, the fastening means comprising a tube of heat shrinkable material disposed over and against part of the clamping means and having opposite annular side sections respectively disposed outboard of the clamping means and having been heat shrunk to circumferentially and radially inwardly engage against the one of the opposite ends of the hose to hold the clamping means thereon.

Accordingly, it is an object of this invention to provide a new hose construction having one or more of the novel features of this invention as set forth above or hereinafter shown or described.

Another object of this invention is to provide a new method of making such a hose construction, the method of this invention having one or more of the novel features of this invention as set forth above or hereinafter shown or described.

Other objects, uses and advantages of this invention are apparent from a reading of this description which proceeds with reference to the accompanying drawings forming a part thereof and wherein:

DESCRIPTION OF THE PREFERRED EMBODIMENTS

Figure 1:
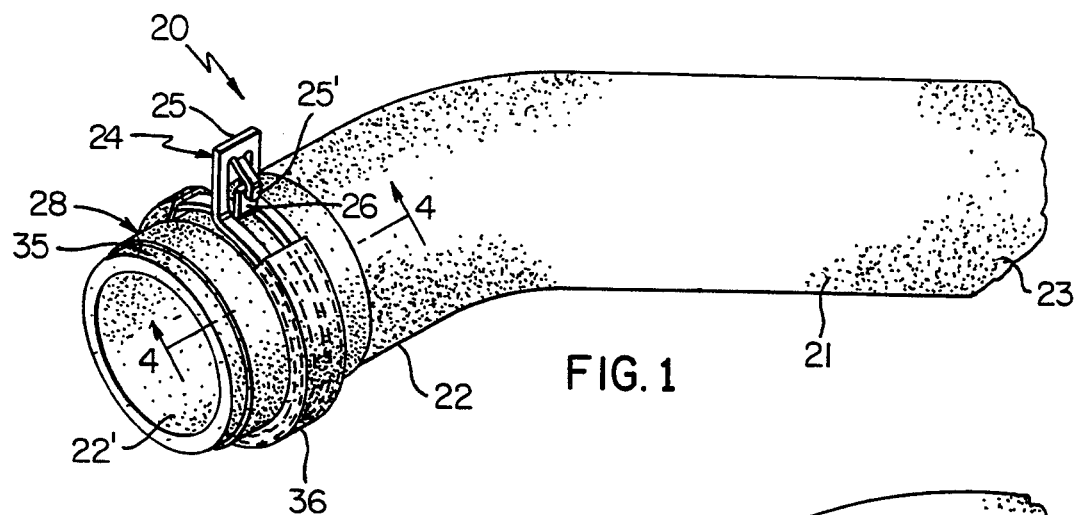
FIG. 1 is a fragmentary perspective view of a new hose construction of this invention.

While the various features of this invention are hereinafter illustrated and described as being particularly adapted to provide a hose construction for a vehicle coolant system, it is to be understood that the various features of this invention can be utilized singly or in various combinations thereof to provide a hose construction for other structures as desired.

Therefore, this invention is not to be limited to only the embodiments illustrated in the drawings, because the drawings are merely utilized to illustrate one of the wide variety of uses of this invention.

Referring now to FIG. 1, the new hose construction of this invention is generally indicated by the reference numeral 20 and comprises a tubular flexible hose 21 having opposite ends 22 and 23, the hose 21 being formed mainly of a suitable polymeric material that is adapted to be utilized as a conduit means in the coolant system of an internal combustion engine (not shown) for a transportation vehicle or the like (not shown). If desired, the flexible tubular hose 21 can be cured in a manner well known in the art so as to have a particular prebent shape so as to be compatible with its positioning in the aforementioned coolant system. For example, see the aforementioned Worley et al, U.S. Pat. No. 5,145,218, whereby this U.S. patent is being incorporated into this disclosure by this reference thereto. Also see the Bare, U.S. Pat. No. 3,729,027, whereby this U.S. patent is also being incorporated into this disclosure by this reference thereto.

The hose construction 20 also comprises one or more clamping means, each clamping means being generally indicated by the reference numeral 24. The embodiment of the hose construction 20 illustrated in FIG. 1 has a clamping means 24 for end 22 of the flexible hose 21 with the understanding that the other end 23 could have a like clamping means or a different clamping means carried thereby in a like manner, as desired.

The clamping means 24 is formed of any suitable metallic material that has a natural spring force to tend to circumferentially move apart a pair of end portions 25 and 26 thereof so as to shrink the defining circumference of an annular band 27 thereof from the relatively large circumference defined thereby when the ends 25 and 26 are toggled together in the manner illustrated in FIGS. 1–5 to a smaller circumferential configuration thereof when the end projections 25 and 26 are released from each other so that the clamping means 24 will move to its clamping condition in a manner well known in the art. For example, see the aforementioned Worley et al, U.S. Pat. No. 5,145,218, as well as the Muhr, U.S. Pat. No. 4,773,129, and the Hashimoto et al, U.S. Pat. No. 4,425,682, whereby these last two U.S. patents are also being incorporated into this disclosure by this reference thereto.

Figure 5:
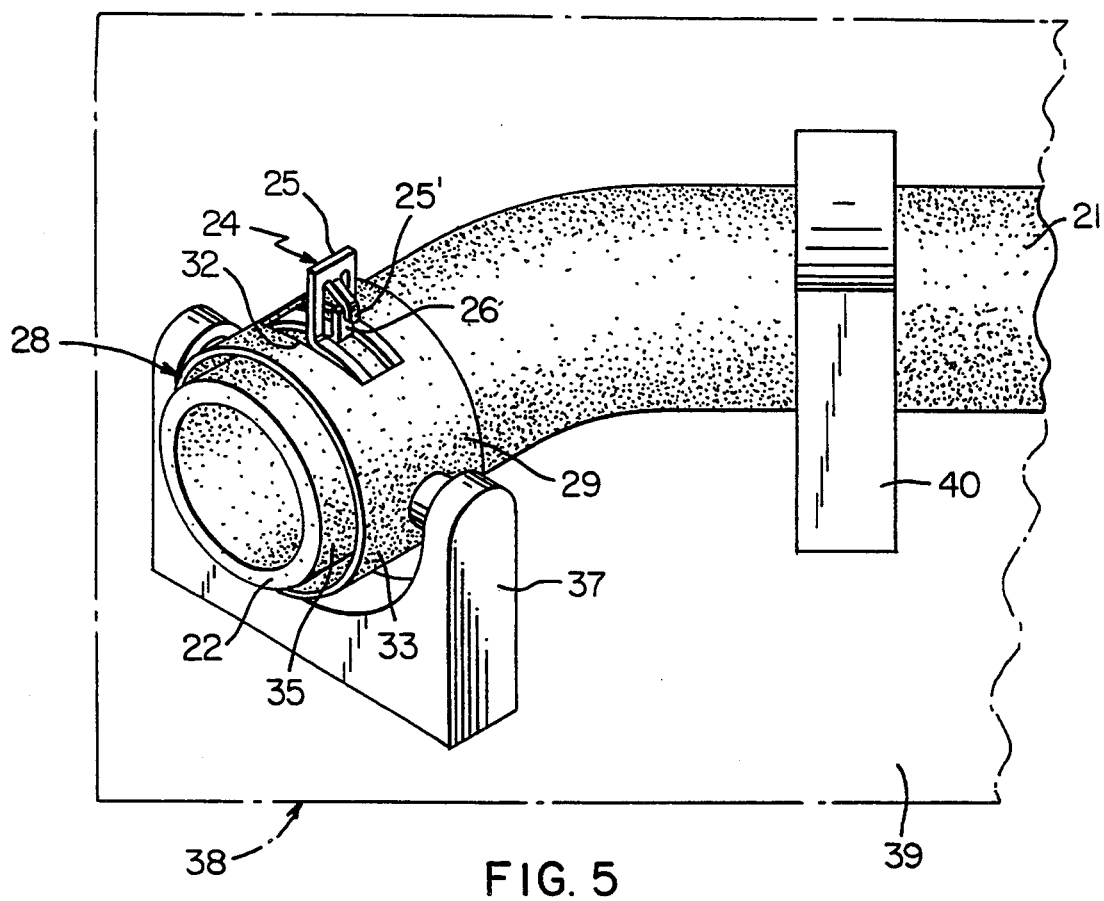
FIG. 5 is a fragmentary perspective view illustrating the apparatus of this invention for forming the hose construction of FIG. 1.
Figure 4:
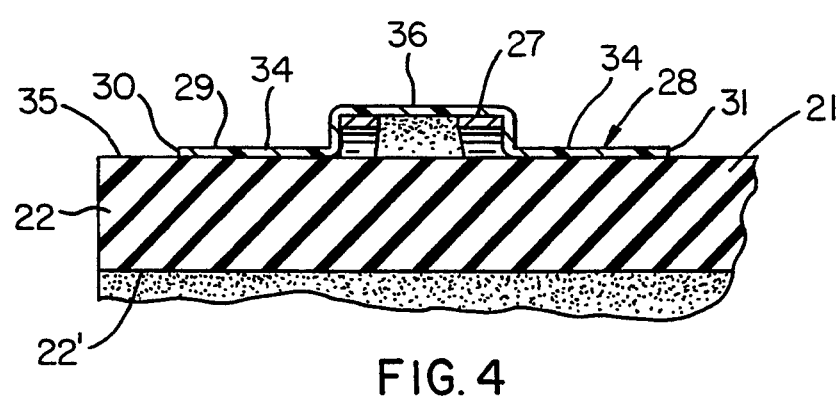
FIG. 4 is an enlarged fragmentary cross-sectional view taken on line 4—4 of FIG. 1.

Therefore, it can be seen that the upstanding end 26 of the clamping means 24 can be toggled under a tongue 25' of the upstanding end 25 of the clamping means 24 in the manner illustrated in FIGS. 1–3 and 5 so as to hold the ends 25 and 26 in the clamped-open condition thereof so that the diameter being defined by the band means 27 of the open clamping means 24 is larger than the outside diameter of the end 22 of the hose 21 that is to be subsequently telescoped within the open clamping means 24 in the manner illustrated in FIG. 5 for a purpose hereinafter set forth.

However, when the ends 25 and 26 of the clamping means 24 are untoggled from each other by forcing the end 26 out from under the tang 25' of the end 25, the natural spring force of the clamping means 24 circumferentially spreads apart the end portions 25 and 26 thereof so as to substantially circumferentially and radially inwardly shrink the resulting diameter of the band means 27 so that the clamping means 24, which when disposed about the end 22 of the flexible hose 21, is adapted to cause the end 22 to be substantially circumferentially and radially inwardly compressed or clamped onto an external peripheral surface of a tubular member (not shown) that has been previously inserted into the opening 22' at the end 22 of the hose 21 so as to be fluid sealed and secured thereto and thereby provide a fluid path for the coolant flow of the coolant structure of the internal combustion engine (not shown) for a purpose well known in the art. For example, see the aforementioned Worley et al, U.S. Pat. No. 5,145,218.

As previously stated, one of the features of this invention is to uniquely fasten the clamping means 24 to the end 22 of the hose 21 so that the clamping means 24 will be carried by the hose construction 20 in the proper location thereon to be subsequently utilized for fastening the end 22 to the desired structure when needed.

In particular, it was found according to the teachings of this invention that the clamping means 24 can be secured to the end 22 of the hose 21 by utilizing a unique fastening means that is generally indicated by the reference numeral 28 and comprising a short tube 29 of heat shrinkable material having opposed open ends 30 and 31 with an opening means 32 formed therethrough intermediate the ends 30 and 31. The inside diameter of the tube 29 is so selected that the same is adapted to readily receive the open clamping means 24 therein in the manner illustrated in FIG. 3 so that the projecting parts 25 and 26 of the clamping means 24 project out through the opening means 32 to be exposed at the exterior peripheral surface 33 of the tube 29.

The tube 29 is also so sized relative to the annular band 27 of the clamping means 24 that opposite annular side sections 34 of the tube 29 extend respectively outboard of the annular band 27 of the clamping means 24 for a purpose hereinafter set forth.

Figure 2:
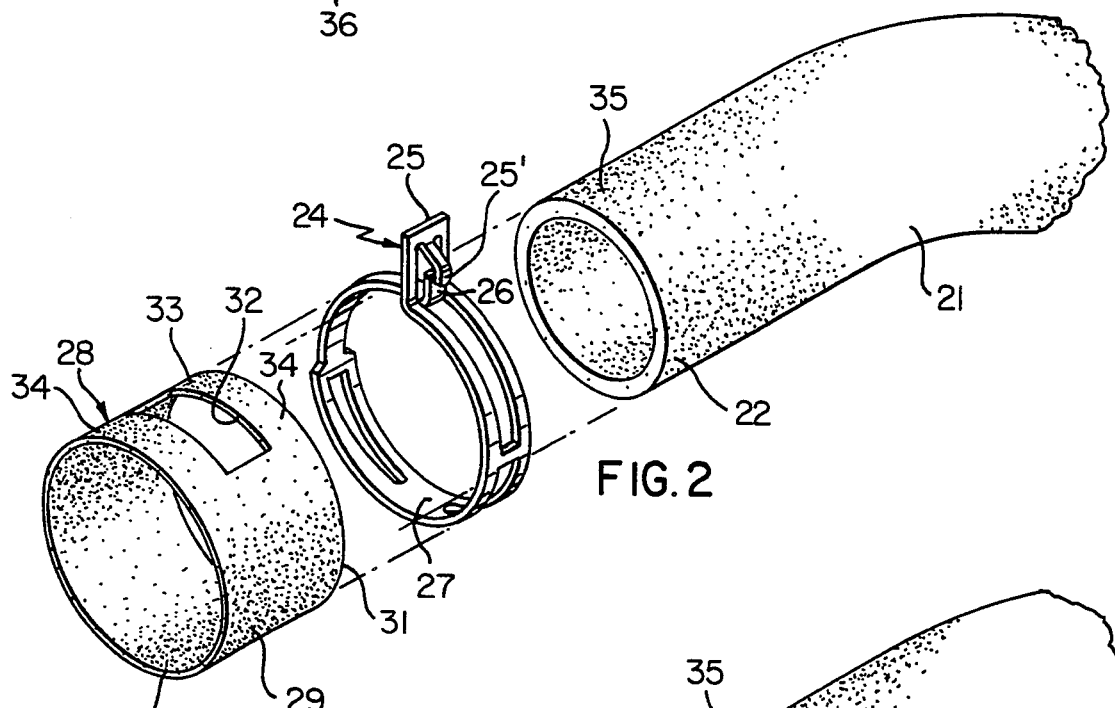
FIG. 2 is an exploded fragmentary perspective view of the various parts of the hose construction of FIG. 1.
Figure 3:
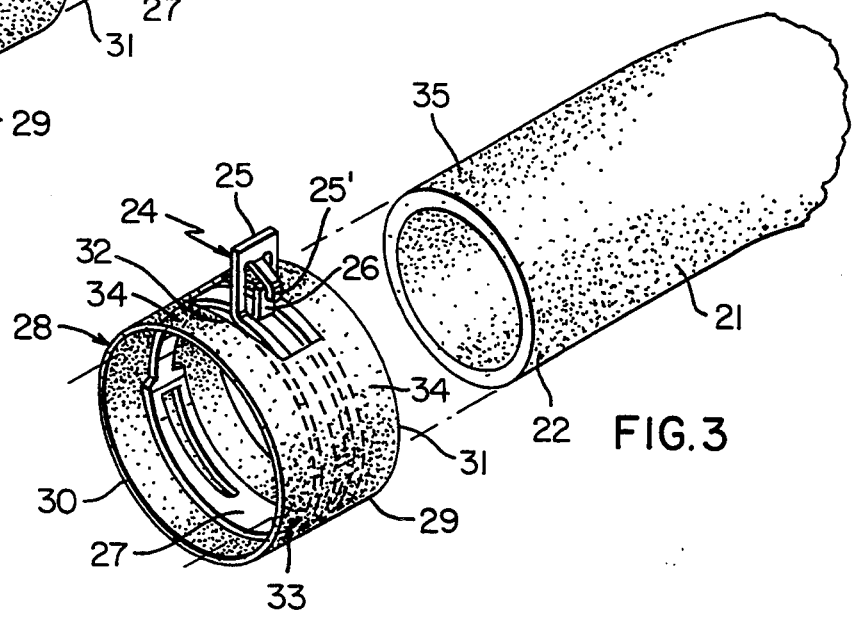
FIG. 3 is a view similar to FIG. 2 and illustrates how the clamping means and the tube of heat shrinkable material are assembled together before being assembled as a unit on third of the flexible hose.

After the clamping means 24 and tube 29 have been assembled together in the manner illustrated in FIG. 3, the same can be assembled as a unit onto the end 22 of the hose 21 in any suitable manner and be subsequently secured thereto by heat shrinking the tube 29 so that the annular side sections 34 and 34 substantially circumferentially and radially inwardly engage against the outer peripheral surface 35 of the end 22 of the hose 21 in the manner illustrated in FIG. 2 while a medial section 36 of the tube 29 shrinks into full engagement against the annular band 27 of the clamping means 24 as also illustrated in FIG. 1.

Such heat shrinking of the tube 29 not only holds the clamping member 24 on the end 22 of the hose 21, but also the heat shrunk tube 29 prevents axial and rotational movement of the clamping means 24 on the end 22 of the hose 21 so that the same will be held in a predetermined position thereon for subsequently operating the clamping means 24 when the hose construction 20 is disposed in its assembled condition in the engine compartment of a vehicle or the like.

In fact, the assembled clamping means 24 and tube 29 in its nonheat shrunk condition can be disposed as a unit in a fixture 37 of an apparatus 38 of this invention that comprises a heating chamber 39 with the fixture 37 located therein and holding the assembled tube 29 and clamping means 24 in a desired axial and rotational position so that when the end 22 of the hose 21 is subsequently telescoped within the held tube 29 and clamping means 24, another fixture 40 can hold the hose 21 in its proper position so that the projecting portions 25 and 26 of the clamping means 24 will be in a proper rotational and axial position on the hose 21 as provided by the fixtures 37 and 40. Thereafter, heated air or the like can be directed into the chamber 39 to heat the tube 29 and thereby heat shrink the tube 29 in the manner illustrated in FIG. 1 and previously described so as to fasten the clamping means 24 in its predetermined position on the end 22 of the hose 21. The hose 21 is then removed from the chamber 39 of the apparatus 38 and the hose 21 can be attached to the desired structure that is inserted into the opening 22' at the end 22 of the hose 21 by having the clamping means 24 substantially circumferentially and radially inwardly clamp the end 22 thereon when the end 26 is untoggled from the end 25 all in a manner well known in the art.

Therefore, it can be seen that it is a relatively simple method of this invention to make the hose construction 20 of this invention.

While the tube 29 of heat shrinkable material for the hose construction 20 can be of any suitable material, one embodiment thereof comprises a polyolefin filmed tubing known as 3M FP301 sold by the 3M Corporation of Minneapolis, Minn. Also, while the tube 29 can have any desired size relative to the clamping means 24 to function in the manner previously set forth, in the one working embodiment thereof, the tube 29 has an internal diameter that is approximately ⅛ of an inch to approximately ¼ of an inch larger than the outside diameter of the end 22 of the hose 21 and has a width which is wider than the clamping means 24 by about 2 inches. The opening 32 in the tube 29 is approximately one inch long and approximately as wide as the annular band 27 of the clamping means 24. The tube 29 may be sized to fit snugly on the opened clamping means 24 once the projecting parts 25 and 26 of the clamping means 24 are placed through the opening 32. However, the tube 29 may be larger if desired. Also, it is to be understood that the opening means 32 could take any desired configuration such as oval, elliptical, etc. In fact, the same could just merely be a single slit through the tube 29.

Figure 14:
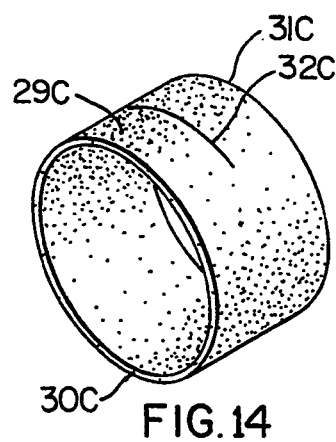
FIG. 14 is a perspective view of another tube of heat shrinkable material of this invention for forming any of the hose constructions of this invention.
Figure 13:
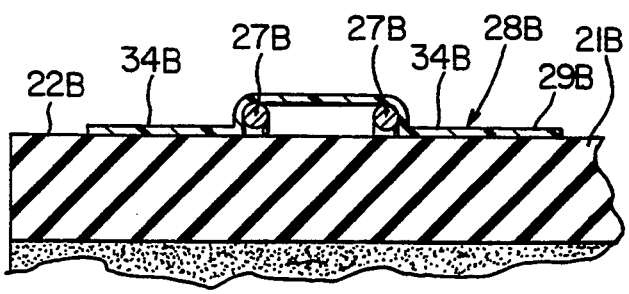
FIG. 13 is an enlarged fragmentary cross-sectional view taken line 13—13 of FIG. 10.

For example, reference is now made to FIG. 14 wherein another heat shrinkable tube of this invention is indicated by the reference numeral 29C and parts thereof similar to the tube 29 previously described are indicated by like reference numerals followed by the reference letter "C".

As illustrated in FIG. 14 the tube 29C merely has a single slit 32C formed therethrough intermediate the opposed ends 30C and 31C thereof and through which the protruding portions 25 and 26 of the clamping means 24 could be forced should such clamping means 24 be utilized with the tube 29C. Of course, other types of clamping means could be utilized with the tube 29C, if desired.

For example, the clamping means of FIGS. 6–9 or the clamping means of FIGS. 10–13, as well as other types of clamping means, could be utilized with the tube 29C, if desired.

Another hose construction of this invention is generally indicated by the reference numeral 20A in FIGS. 6–9 and parts thereof similar to the parts of hose construction 20 previously described are indicated by like reference numerals followed by the reference letter "A".

As illustrated in FIGS. 6–9, the hose construction 20A also comprises a flexible hose 21A having an annular clamping means 24A fastened to the external peripheral surface means 35A of an end 22A thereof by a fastening 28A of this invention that comprises a tube 29A of heat shrinkable material, the clamping means 24A being of the type that is set forth in the Dooley, U.S. Pat. No. 4,763,695 whereby this U.S. patent is being incorporated into this disclosure by this reference thereto.

Therefore, it can be seen that it is well known that the clamping means 24A is adapted to have the annular band 27A thereof substantially circumferentially and radially inwardly shrunk around the end 22A of the hose 21A by turning a threaded fastening member 50 of the clamping means 24A in the proper direction for fastening the end 22A of the hose 21A onto a desired tubular structure that has been inserted in the opening 22'A in a manner well known in the art. Of course, the annular band 27A can be circumferentially enlarged by turning the threaded fastening member 50 in the opposite direction in order to remove the previously changed end 22'A.

Figure 6:
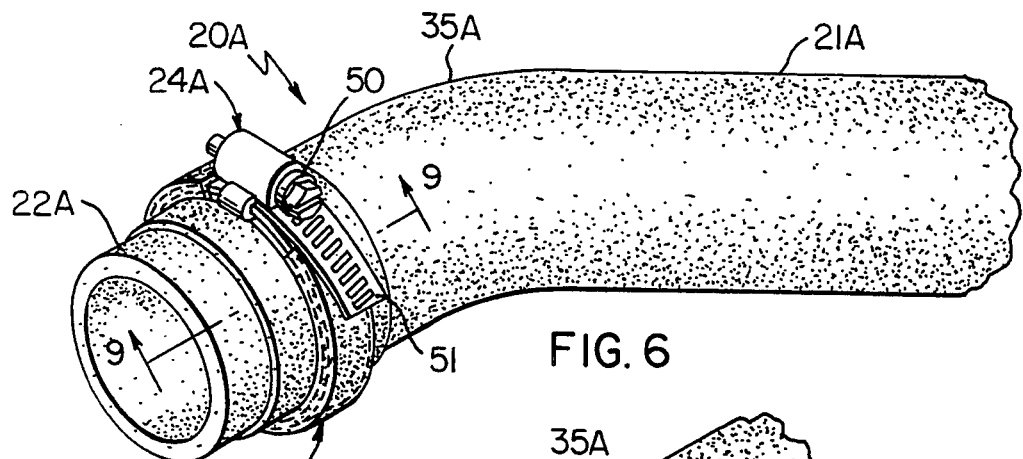
FIG. 6 is a view similar to FIG. 1 and illustrates another new hose construction of this invention.
Figure 7:
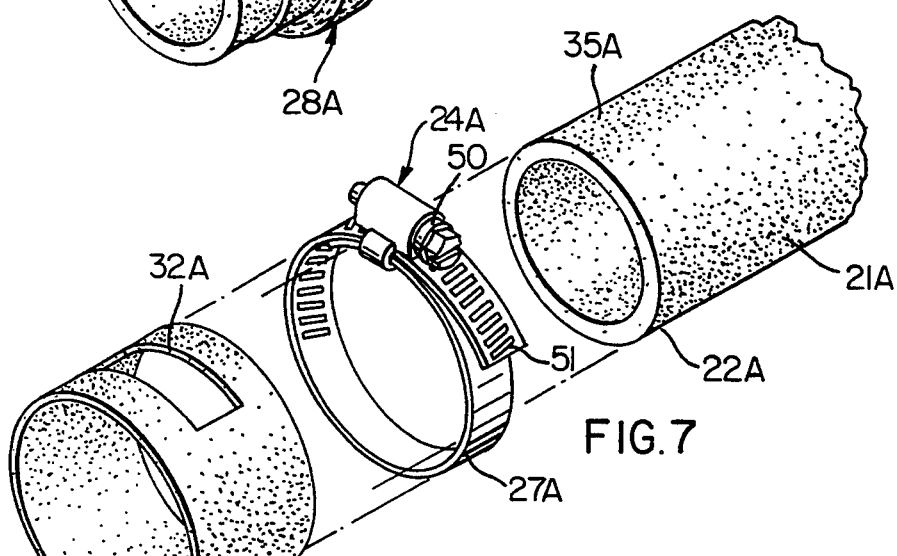
FIG. 7 is a fragmentary exploded perspective view of the various parts of the hose construction of FIG. 6.
Figure 8:
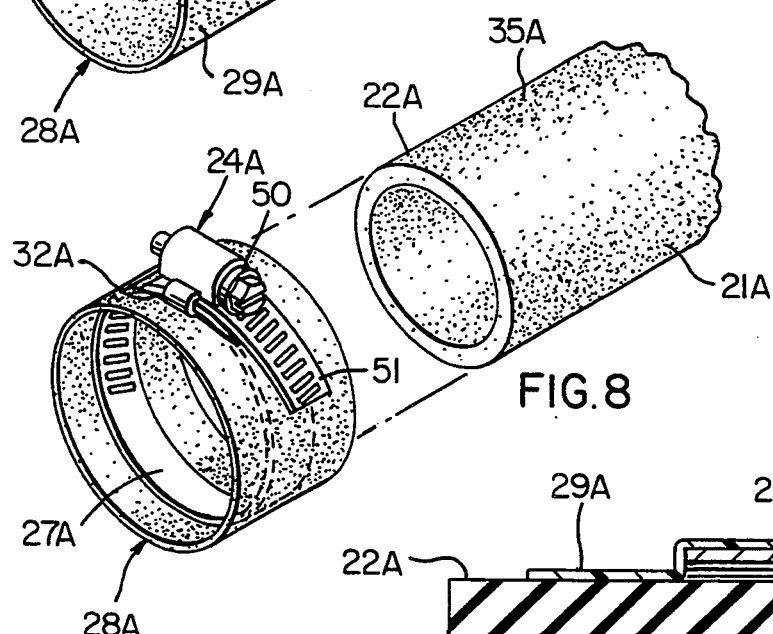
FIG. 8 is a fragmentary perspective view illustrating how the clamping means and the tube of heat shrinkable material are assembled together before being assembled as a unit on the end of the flexible hose.
Figure 9:
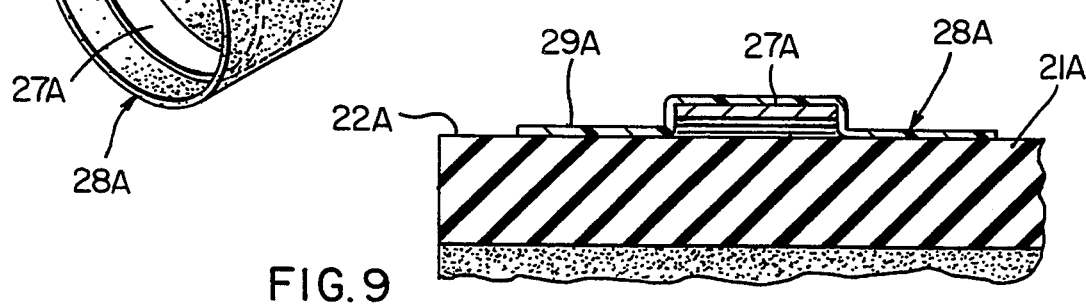
FIG. 9 is an enlarged fragmentary cross-sectional view taken on line 9—9 of FIG. 6.

The opening means 32A in the tube 29A of heat shrinkable material is so formed that the same will permit the fastening means 50 and an exposed end 51 of the annular band 27A to project there through in the manner illustrated in FIGS. 8 and 6 when the clamping means 24A is assembled with the tube 29A for the reasons previously set forth whereby the assembled tube 29A and clamping means 24A can be telescoped as a unit on the end 22A of the flexible hose 21A to thereafter permit the tube 29A to be heat shrunk in the manner illustrated in FIG. 6 to positively secure the clamping means 25A in a predetermined position on the end 22A of the hose 21A in the same manner as the tube 29 previously set forth.

Another hose construction of this invention is generally indicated by the reference numeral 20B in FIGS. 10–13 and parts thereof similar to the parts of the hose constructions 20 and 20A previously described are indicated by like reference numerals followed by the reference letter "B".

As illustrated in FIGS. 10–13, the hose construction 20B also comprises a flexible hose 21B having an annular clamping means 25B fastened to the external peripheral surface means 35B of an end 22B thereof by a fastening means 28B of this invention that comprises a tube 29B of heat shrinkable material formed in the manner previously described.

The clamping means 24B is of the type that is set forth in the Proctor et al, U.S. Pat. No. 4,592,976, whereby this patent is being incorporated into this disclosure by this reference thereto, such clamping member also being shown in the Denyes, U.S. Pat. No. 3,365,218, and being illustrated in FIG. 10 thereof in its clamping condition for clamping an end of a hose onto a tubular member inserted therein whereby this U.S. patent is also being incorporated into this disclosure by this reference thereto.

Therefore, since the structure and operation of the annular clamping means 24B is well known in the art, only the details thereof that are necessary to understand the features of this invention will now be set forth.

As illustrated in the drawings, the annular clamping means 24B includes a pair of spaced apart parallel and substantially circular rod-like members 27B that are adapted to be circumferentially enlarged or contracted upon the rotation of a threaded fastening member 50B in the proper direction thereof.

Figure 10:
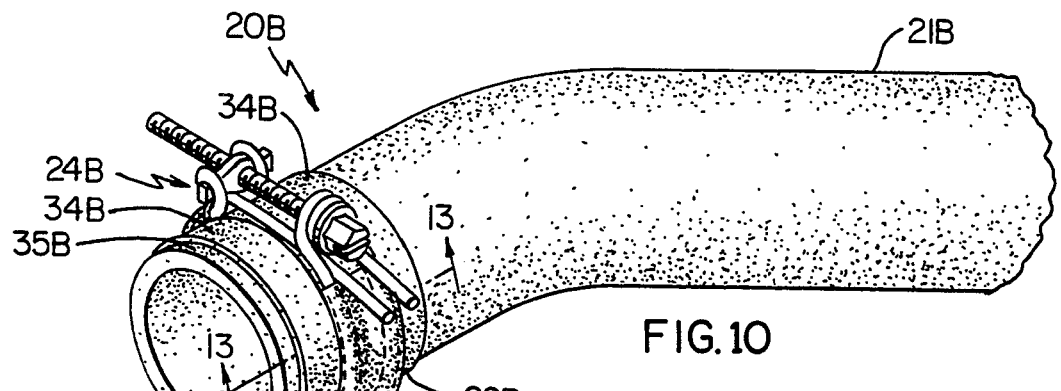
FIG. 10 is a view similar to FIG. 1 and illustrates another new hose construction of this invention.
Figure 11:
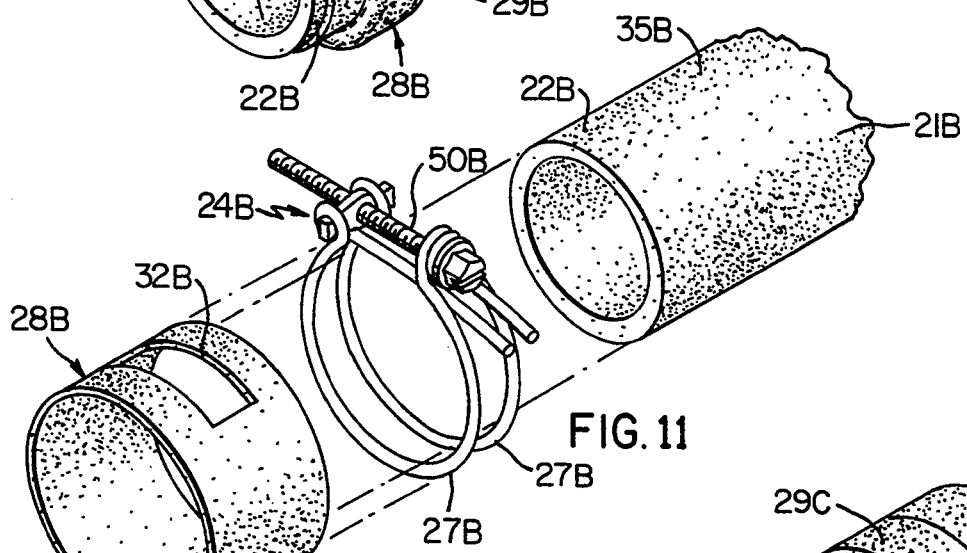
FIG. 11 is a fragmentary exploded perspective view of the various parts of the hose construction of FIG. 10.
Figure 12:
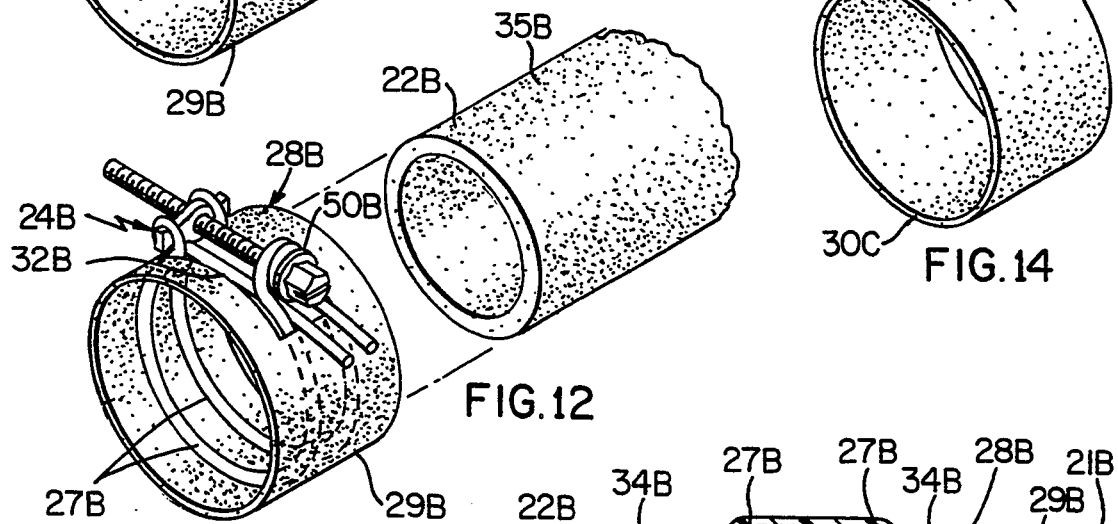
FIG. 12 is a fragmentary exploded perspective view illustrating how the clamping means and the tube of heat shrinkable material are assembled together before being assembled as a unit on the end of the flexible hose.

The opening 32B in the tube 29B is formed of a size that is sufficient to permit the threaded fastening member 50B and the encircling parts of the annular bands 27B to protrude therethrough in the manner illustrated in FIG. 12 so that the annular clamping means 25B and tube 29B can be assembled together as a unit as illustrated in FIG. 12 to be subsequently telescoped on the end 22B of the flexible hose 21B to have the tube 29B subsequently heat shrunk thereon in the manner illustrated in FIG. 10 and in the manner previously set forth to secure the clamping means 24B in a predetermined position on the end 22B of the hose 21B whereby the clamping means 25B can subsequently clamp the end 22B onto a member inserted into the opening 21'B of the end 22B of the hose 21B when the fastening member 50B is rotated in the proper direction.

Therefore, it can be seen that the tube 29, 29A or 29B of this invention is formed of a size relative to its particular clamping means 24, 24A or 24B so that the annular sections 34, 34A or 34B thereof respectively extend outboard of the annular band means 27, 27A or 27B of the respective clamping means 24, 24A or 24B to be substantially circumferentially and radially inwardly heat shrunk into engagement with the external peripheral surface means 35, 35A or 35B of the flexible hose 21, 21A or 21B to fasten the respective clamping means 25, 25A or 25B in a predetermined position on the end 22, 22A or 22B of the respective flexible hose 21, 21A or 21B in a unique manner and still permits the clamping means 24, 24A or 24B to be closed or opened by a person operating the exposed parts 25, 26, 50 or 50B thereof.

Therefore, it can be seen that this invention not only provides a new hose construction, but also this invention provides a new method of making such a hose construction.

While the forms and methods of this invention now preferred have been illustrated and described as required by the Patent Statute, it is to be understood that other forms and method steps can be utilized and still fall within the scope of the appended claims wherein each claim sets forth what is believed to be known in each claim prior to this invention in the portion of each claim that is disposed before the terms "the improvement" and sets forth what is believed to be new in each claim according to this invention in the portion of each claim that is disposed after the terms "the improvement" whereby it is believed that each claim sets forth a novel, useful and unobvious invention within the purview of the Patent Statute.

What is claimed is:

1. In a method of making a hose construction comprising the steps of providing a tubular flexible hose having opposite ends, providing a fastening means, and fastening a clamping means to one of said opposite ends of said hose by said fastening means for substantially circumferentially and radially inwardly clamping said one of said opposite ends of said hose onto a member that has been inserted into said one of said opposite ends of said hose, the improvement comprising the steps of forming said fastening means to comprise a tube of heat shrinkable material, snugly fitting said tube of heat shrinkable material over and against said clamping means to form a self-contained unit therewith, telescoping said unit onto said one of said opposite ends of said hose, and then heat shrinking said tube of heat shrinkable material so that said tube of heat shrinkable material is disposed over and against part of said clamping means and has opposite annular side sections respectively disposed outboard of said clamping means and having been heat shrunk to circumferentially and radially inwardly engage against said one of said opposite ends of said hose to hold said clamping means thereon.

2. A method as set forth in claim 1 and comprising the steps of forming said tube of heat shrinkable material with an opening means therethrough intermediate said opposite annular side sections thereof, and disposing a remaining part of said clamping means through said opening means so as to be exposed beyond the exterior of said tube of heat shrinkable material.

3. A method as set forth in claim 2 wherein said remaining part of said clamping means comprises means for substantially circumferentially and radially inwardly collapsing said clamping means.

4. A method as set forth in claim 2 and comprising the step of forming said opening means to comprise a rectangular slot.

5. A method as set forth in claim 2 and comprising the step of forming said opening means to comprise a slit.

6. A method as set forth in claim 1 and comprising the step of forming said tube of heat shrinkable material from polyolefin.

7. A method as set forth in claim 1 and comprising the step of holding said unit in a fixed position, then inserting said one of said opposite ends of said hose into said held unit so as to be in a predetermined telescoped position relative to said unit, and then heat shrinking said tube of heat shrinkable material while said unit is being held in said fixed position thereof and while said one of said opposite ends of said hose is in said predetermined position thereof.

* * * * *